(12) United States Patent
Hermanson

(10) Patent No.: US 7,104,104 B1
(45) Date of Patent: Sep. 12, 2006

(54) RECTANGULAR AND SQUARE DUCTING SYSTEMS

(76) Inventor: Jeffrey Allen Hermanson, 316 Ellingson Rd., Algona, WA (US) 98001

( * ) Notice: Subject to any disclaimer, the term of this patent is extended or adjusted under 35 U.S.C. 154(b) by 307 days.

(21) Appl. No.: 10/359,017

(22) Filed: Feb. 3, 2003

Related U.S. Application Data

(60) Provisional application No. 60/353,807, filed on Feb. 1, 2002, provisional application No. 60/368,632, filed on Mar. 27, 2002.

(51) Int. Cl.
  *B21C 37/30* (2006.01)
  *F16L 9/00* (2006.01)
(52) U.S. Cl. ............... 72/370.26; 29/897.31; 29/412; 29/417; 138/163
(58) Field of Classification Search .......... 29/897, 29/897.3, 897.31, 412, 417; 285/242, 424; 138/155, 158, 163; 72/370.026
See application file for complete search history.

(56) References Cited

U.S. PATENT DOCUMENTS

| | | | | |
|---|---|---|---|---|
| 565,499 A * | 8/1896 | Pattison | ....................... | 285/404 |
| 2,123,410 A * | 7/1938 | Fawcett | ....................... | 138/159 |
| 3,001,805 A * | 9/1961 | Jones et al. | .................. | 285/397 |
| 3,347,569 A * | 10/1967 | Lindgren | ...................... | 285/64 |
| 3,712,649 A * | 1/1973 | Martin | ....................... | 285/397 |
| 3,815,638 A * | 6/1974 | Martin | ....................... | 138/103 |
| 3,871,688 A * | 3/1975 | Molino | ....................... | 285/189 |
| 4,046,409 A * | 9/1977 | Virgin | ....................... | 285/305 |
| 4,215,518 A * | 8/1980 | Blair | .......................... | 52/658 |
| 4,516,797 A * | 5/1985 | Meinig | ....................... | 285/405 |
| 5,022,688 A * | 6/1991 | Arnoldt | ....................... | 285/363 |
| 6,540,266 B1 * | 4/2003 | Pakker | ....................... | 285/424 |
| 2002/0094233 A1 * | 7/2002 | Price et al. | .................. | 403/338 |

* cited by examiner

*Primary Examiner*—Eric Compton
(74) *Attorney, Agent, or Firm*—Christensen O'Connor Johnson Kindness pllc

(57) ABSTRACT

A duct structure (50), includes lengths of square/rectangular duct (52) manufactured by pre-forming the duct in round cross-section (51) and then transforming the round cross-section into square and rectangular cross-sections utilizing expandable die structures (58). The duct (52) may be connected together end to end by flanged connectors (54) formed from strip stock (71), that is notched at locations that correspond to the corners of the formed flange connector. The cross-sectional profile of the flanged connector is then formed by roll forming and/or bending and/or other techniques. Thereafter, the strip stock is bent at its notched locations to define the corners (80) of the flange connector (54) and then the free ends of the strip stock are fixed together.

22 Claims, 15 Drawing Sheets

RECTANGULAR AND SQUARE DUCTING SYSTEMS

CROSS-REFERENCES TO RELATED APPLICATIONS

The present application claims the benefit of U.S. Application Ser. Nos. 60/353,807 filed Feb. 1, 2002, and 60/368,632 filed Mar. 27, 2002.

FIELD OF THE INVENTION

The present invention relates to rectangular and square heating, ventilating and air conditioning (HVAC) ducting and methods of making and interconnecting such ducting.

BACKGROUND OF THE INVENTION

Square and rectangular ducting are widely used in HVAC systems. Such ducting can be located between floor or ceiling joists whereas ducting of other cross-sectional shapes, such as round, may not fit in such locations and still be sufficiently large enough in size to handle the HVAC load required.

Referring to FIGS. 1–3, it is known to manufacture square and rectangular ducting structures such as structure 20, by bending a sheet of thin-gauge material to form the corners and the four walls of a length of ducting 22 and then join the duct together along one corner 24 to form an integral structure. This corner joint may take various forms, such as by overlapping portions of the ducting and then screwing the overlapped portions together, or by utilizing an "S" shaped flange 26 or other shaped member to join the ducting along corner 24. Typically, lengths of square and rectangular ducting produced in this manner are relatively limited in length due to the size of the brake press or other machinery used to form the corners of the ducting and also limited by the length of the sheet metal stock available.

Because square and rectangular cross-section HVAC ducting is typically of relatively short lengths, it is necessary to connect ducting sections end-to-end to achieve a desired overall length. In this regard, as shown most clearly in FIGS. 1 and 2, a face flange structure 28 is integrally formed at the ends of each wall of the duct 22. The face flange structure has a mating or face section 30 extending perpendicularly to the corresponding wall of duct 22 and a reinforcement hem structure 32 extending transversely from the distal edge flange face 30. The hem structure 32 may be folded over on itself to form a double thick section for additional strength. In FIG. 1, the hem structure 32 is folded inwardly on itself whereas in FIG. 2, the hem section is folded outwardly on itself.

As will be appreciated by the foregoing construction, it is not possible to extend the face flanges 28 to occupy the entire corner at the juncture between two adjacent panels of the ducting structure 20. Such open corners are "filled in" by an angle bracket 34 that typically nests with the adjacent portions of the face flange structures 28. FIG. 1 shows the angle brackets 34 prior to installation, whereas FIG. 2 illustrates the angle flanges in installed positions. The angle flanges include corner apertures 35 for receiving a hardware fastener 36 therethrough. The hardware fastener may be in the form of a threaded screw that mates with a nut 38. In this manner, the face flange structures 28 are connected together in face-to-face relationship at the corners of the ducting structure 20. A flat or other shaped gasket 40 may be interposed between adjacent flange faces 30 in an effort to provide an airtight seal therebetween.

However, a sufficient seal usually is not achieved through the use of only the angle brackets 34. As such, typically formed clips 40 are used to also retain the adjacent face flange structures 28 together in an engaged face-to-face relationship. As shown in FIG. 2, the clip 40 is shaped and sized to wrap around the reinforcement hem structures 32 of the face flange structures 28.

Referring to FIG. 3, typically reinforcing members are needed to increase the structural integrity of ducting sections 20 and to prevent the ducting sections from unduly vibrating. FIG. 3 illustrates such reinforcing members in the form of "Z" brackets 42 that extend transversely across duct 22, with one of the flange sections of the brackets attached to the duct by hardware members, welding or otherwise.

It can be appreciated that the prior art ducting structure shown in FIGS. 1–3 is time-consuming and expensive not only to fabricate, but also to assemble and install in the field. The present invention is directed to more economical and faster methods for manufacturing, assembling and installing HVAC ducting of a rectangular or square cross-section.

SUMMARY OF THE INVENTION

A ducting structure of a square or rectangular cross-section is formed from round duct sections that are transformed into square or rectangular cross-sections by an expansion apparatus composed die structures of structures that press against the interior of the round cross-sectional duct to force the duct to assume a desired square or rectangular cross-sectional shape.

The square or rectangular cross-sectional duct sections are inner-connected by formed flanged connectors that may be of numerous possible profiles. Each of the flanged connectors does include an insertion section that engages into, or over, the adjacent end portion of the duct section, and a mating flange extending substantially perpendicularly to the insertion section to form a mating surface for face-to-face engagement with the flanged connector of the adjacent duct section. Preferably, but optionally, a re-enforcing section is disposed at the outer perimeter portion of the mating flange. The re-enforcing section may be of numerous configurations, and may include a hem section that extends outwardly from the mating flange and also optionally a return section to enhance the structural integrity and stiffness of the re-enforcing section.

The flanged connectors are formed from strip stock that is notched at it ends and also at other locations along its length to define the location of the corners of the flanged connector. The desired cross-sectional profile of the flanged connector is formed into the strip stock by roll forming, bending, or other well-known processes. Thereafter, the partially formed strip stock is bent at the notch locations to form the corners of the rectangular or square shaped flanged connector. The free ends of the strip stock are then affixed together to form a rigid structure. The thus-formed flanged connector can be attached to the end of a duct section so that adjacent duct sections can be coupled together.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 9:
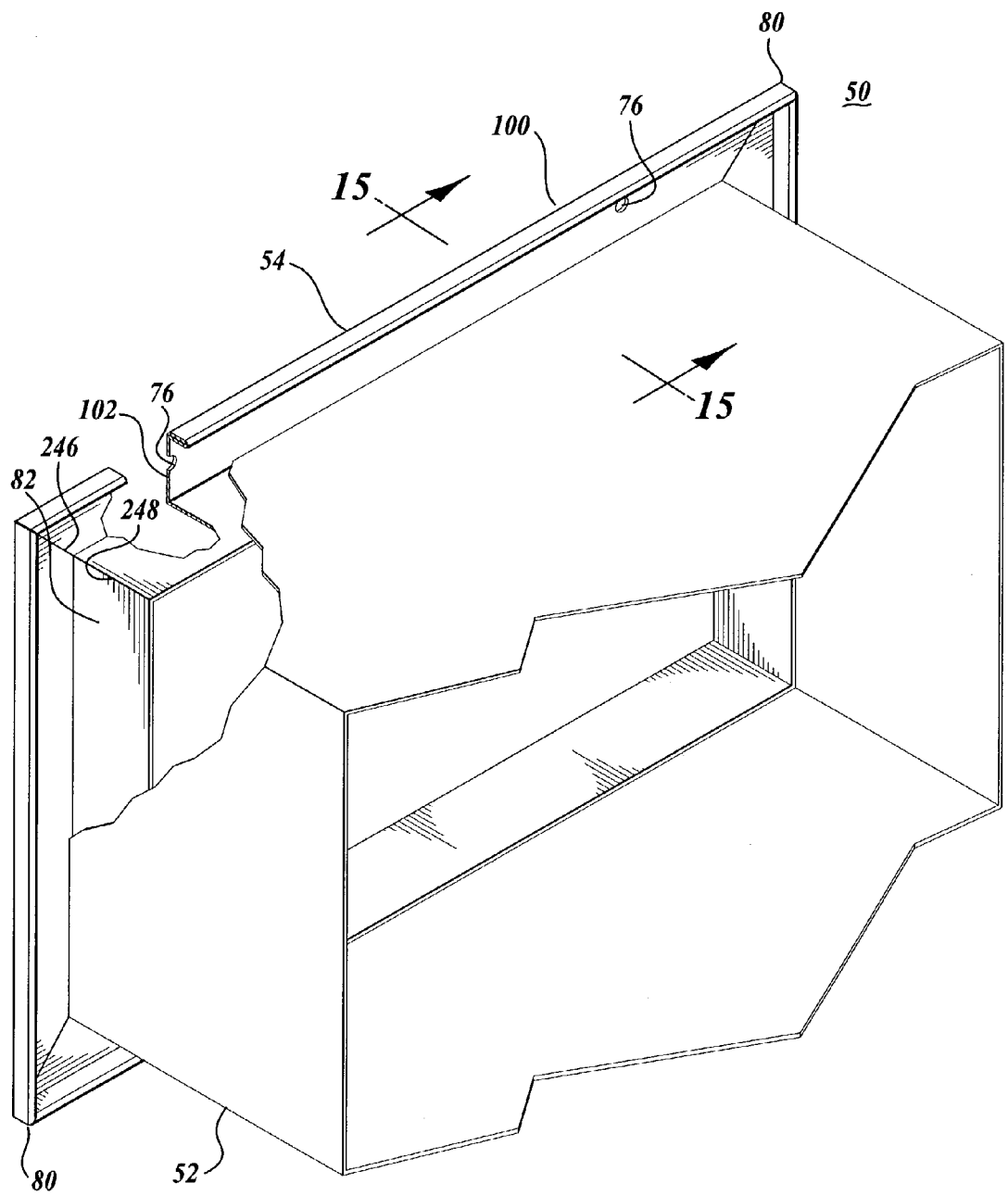
FIG. 9 is fragmentary view of an embodiment of the duct structure of the present invention illustrating a formed flanged connector ring engaged with an end portion of duct of rectangular cross-section, with portions broken away for clarity.

FIG. 9 illustrates a HVAC duct structure 50 constructed in accordance with the present invention. The structure 50 includes a length of ducting 52 constructed in accordance with the present invention and a formed flanged connector ring 54 also constructed in accordance with the present invention and illustrated as affixed to the adjacent end of the ducting.

Figure 6:
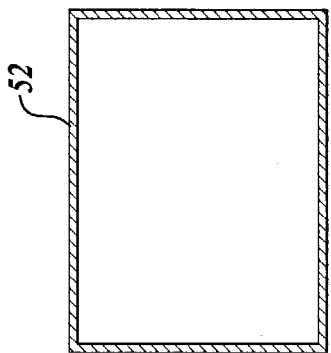
FIG. 6 is a cross-sectional view of a duct section after being transformed by an expansion apparatus from a round cross-section.
Figure 5:
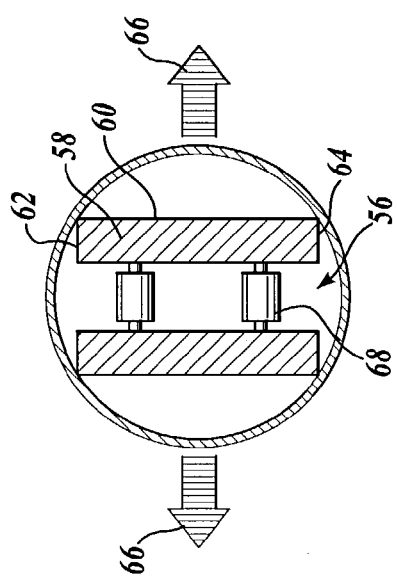
FIG. 5 is a cross-sectional view of the round cross-sectional duct engaged over an expansion apparatus.
Figure 4:
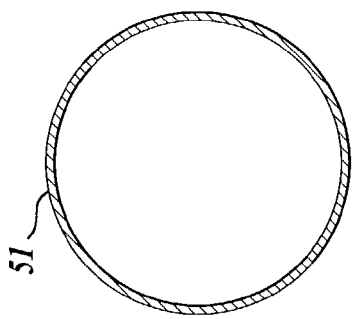
FIG. 4 is a cross-sectional view of a round pre-formed duct.

Next, referring to FIGS. 4–6, one method of manufacturing the duct 52 is illustrated. In accordance with the present invention, round cross-sectional ducting 51 is first prefabricated. Preferably, the preformed duct 51 is in the form of a spiral-seam tube composed of a helically wound sheet metal strip, with the strip edges interconnected to each other by formed lock seams. This is a standard, well-known method of manufacturing round ducting from a continuous sheet metal strip. In this regard, see for example, U.S. Pat. Nos. 3,263,321 and 3,474,514, which are incorporated herein by reference.

The round, preformed ducting 51 is placed over an expansion apparatus 56 which extends lengthwise within the interior of the round duct. The apparatus 56 includes a pair of spaced apart die structures 58, each having an outwardly directed, substantially flat face 60 and upper and lower edge sections 62 and 64 extending transversely from the face. The die structures 58 may be pushed apart from each other by linear actuators 68 so that the outward faces 60 thereof move in the direction of the arrows 66 shown in FIG. 5 while maintaining a parallel relationship to each other. As the die structures move outwardly, they cause the round duct 51 to press against the outward faces 60 and also to press against the upper and lower die edges 62 and 64, thereby to transform the round duct 51 into a rectangular cross section duct 52, shown in FIG. 6. Thereafter, the linear actuators 68 may be activated to retract the die structures 58 to their initial position shown in FIG. 5 so that the formed duct 52 can be removed.

The linear actuators 68 may be of various types and configurations, including, for example, hydraulic cylinders, pneumatic cylinders, etc. Moreover, guideways or guide structures may be employed to assist in maintaining the die outward faces 60 parallel to each other, especially when being extended outwardly in the direction of arrows 66.

Figure 8:
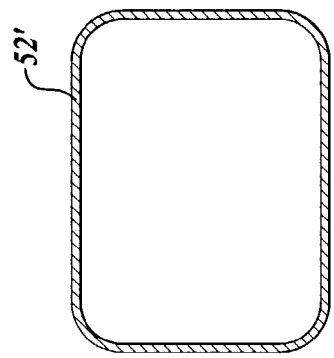
FIG. 8 is a cross-sectional view of a duct after transformation by the apparatus of FIG. 7.
Figure 7:
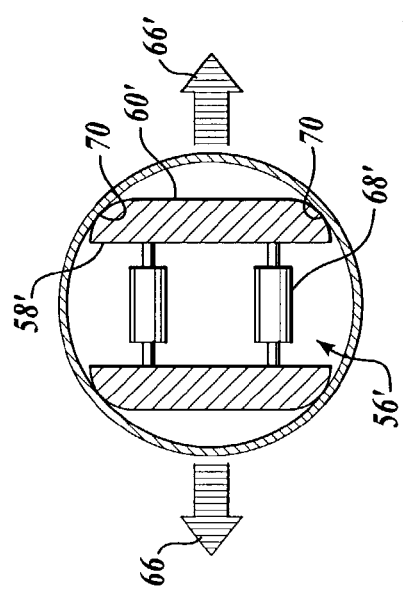
FIG. 7 is an alternative embodiment of an expansion apparatus.

FIGS. 7 and 8 illustrate an alternative embodiment of expansion apparatus 56 wherein the die structures 58' have rounded corners 70 in place of the sharp corners of die structure 58. The components of expansion apparatus 56' that correspond to those components of expansion apparatus 56 are designated with the same part number but with a prime ("'") designation. As shown in FIG. 8, the use of expansion apparatus 56' results in a duct 52' having rounded corners rather than relatively sharp corners of the duct 52 shown in FIG. 6. The rounded corners are thought to provide more efficient airflow through the duct.

It will be appreciated that expansion apparatus 56 and 56' can be utilized to form a square cross-sectional shapes and/or rectangular cross-sectional shapes of various sizes depending on the extent to which the die structures 58/58' are expanded. Also, round pre-form ducting which is longer than the length of the die structure 58/58' may be formed by first transforming one end of the round ducting 51 and then removing the partially formed ducting from the expansion apparatus and inserting it over the die structures 58/58' in a reverse direction, to transform the opposite end of the ducting 51 into the desired cross-section.

Other methods could be utilized to form duct 52/52' in addition to expansion apparatus 56 and 56'. In this regard, an expansion mandrel could be pulled through the round preformed ducting 51. Lengthwise, such expansion mandrel could be circular at a first end having a diameter somewhat smaller than the inside diameter of the preformed ducting 51. From the first end the expansion mandrel could progressively transform from a rounded to a square or rectangular shape of the desired final cross-section of ducting 52. One possible advantage of such an expansion mandrel is that it could be utilized with virtually any length of round preformed ducting 51.

Figure 10:
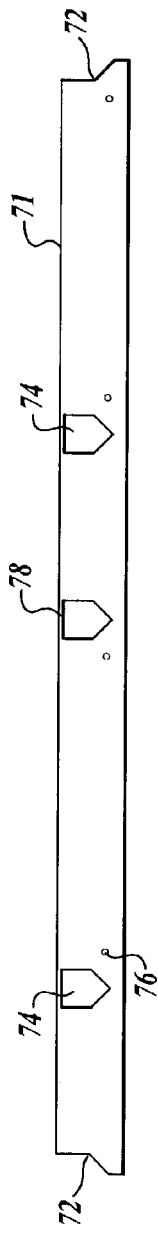
FIG. 10 is planned view of strip stock utilized to form a flanged connector.

Next, methods for making flanged connector ring 54 will be described. Initially referring to FIG. 10, the one piece connector ring 54 may be manufactured from a length of strip stock/material 71 having notches 72 stamped or otherwise cut out of its ends as well as intermediate notches 74 stamped or otherwise cut out along the length of strip stock 71. Alignment holes 76, as discussed more fully below, may also be stamped, punched or otherwise cut out of the strip stock 71. The intermediate notches 74 are located at what will become the corners of the flanged connector ring 54, and the ends of the strip stock will form the fourth corner of the flanged connector ring, as discussed below. The intermediate notches 74 preferably do not "break out" to the edge of the strip stock. Rather, a thin section 78 of strip stock is retained, which will assist in forming the strip stock into a desired profile with less distortion, as discussed below. Each of the intermediate notches 74 includes a rectangular/square portion adjacent thin section 78 and a triangular section opposite thin section 78. The apex of such triangular section corresponds to the center of a corner 80 of the flanged connector ring 54.

The flat strip stock 71 is then formed into a desired profile using rolling and/or bending and/or other well-known techniques. One profile for the connector ring 54 is shown in FIG. 9. This profile corresponds to FIG. 15, which illustrates a cross-sectional view of the connector ring shown in FIG. 9.

Figure 19:
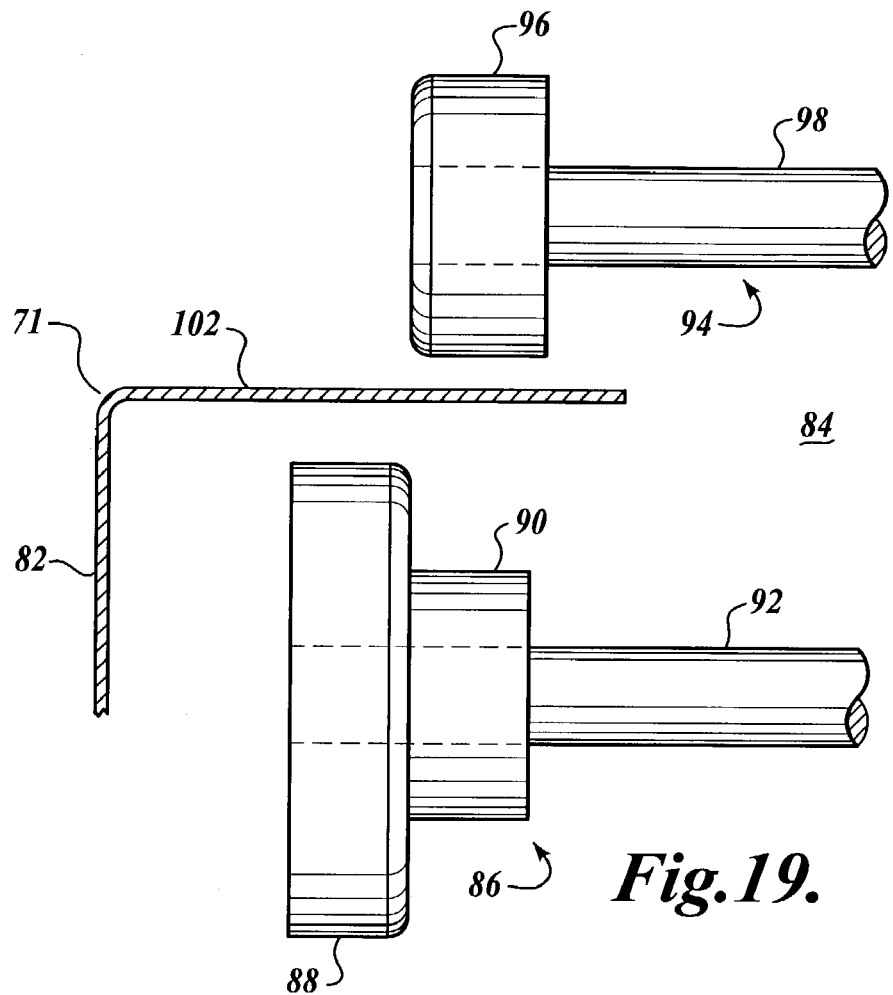
FIG. 19 illustrates one of the steps in roll forming flanged connectors according to the present invention.

The flanged connector ring 54 can be manufactured by first bending or rolling the strip stock 71 lengthwise into an angle shape, as shown in FIG. 19, with a brake press or with rollers as is well known in the art. The vertical leg of the angle shape shown in FIG. 19 corresponds to the insertion section 82, of the formed connector 54, see FIGS. 9 and 15. Thereafter, the horizontal leg of the now angle-shaped strip stock 71 is further formed by a first roller set 84, consisting of a first roller assembly 86, having a major diameter roller 88, and a side-by-side smaller roller 90, mounted on a rotatable shaft 92. The first roller set 84 also includes a second roller assembly 94 consisting of a roller 96, mounted on a rotatable shaft 98. The rotatable shafts 92 and 98 may be moved towards and away from each other in a substantially parallel orientation in a well-known manner. When the shafts are moved towards each other, the roller 96, while positioned at the side of the roller 88, turns a portion of the horizontal leg of the preformed strip stock downwardly to partially form a reinforcing section 100, thereby also defining the width of the mating face section 102 of the formed connector 54. The reinforcing section 100 is captured between the adjacent face sections of the rollers 88 and 96. In addition, a horizontal segment 104 of the reinforcing section 100 is formed between the outer diameter of roller 96 and the outer diameter of roller 90. The vertically disposed segment of the reinforcing section 100 serves a hem section of the connector 54, and the horizontal segment 104 will be formed to serve as a return section of the connector, as discussed below.

Figure 20:
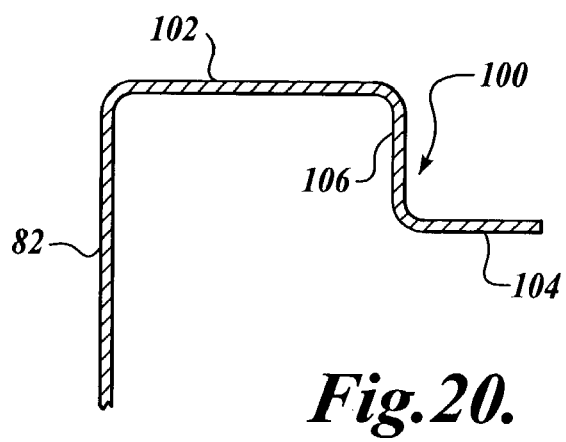
FIG. 20 is a cross-sectional view of a partially formed flanged connector.
Figure 21:
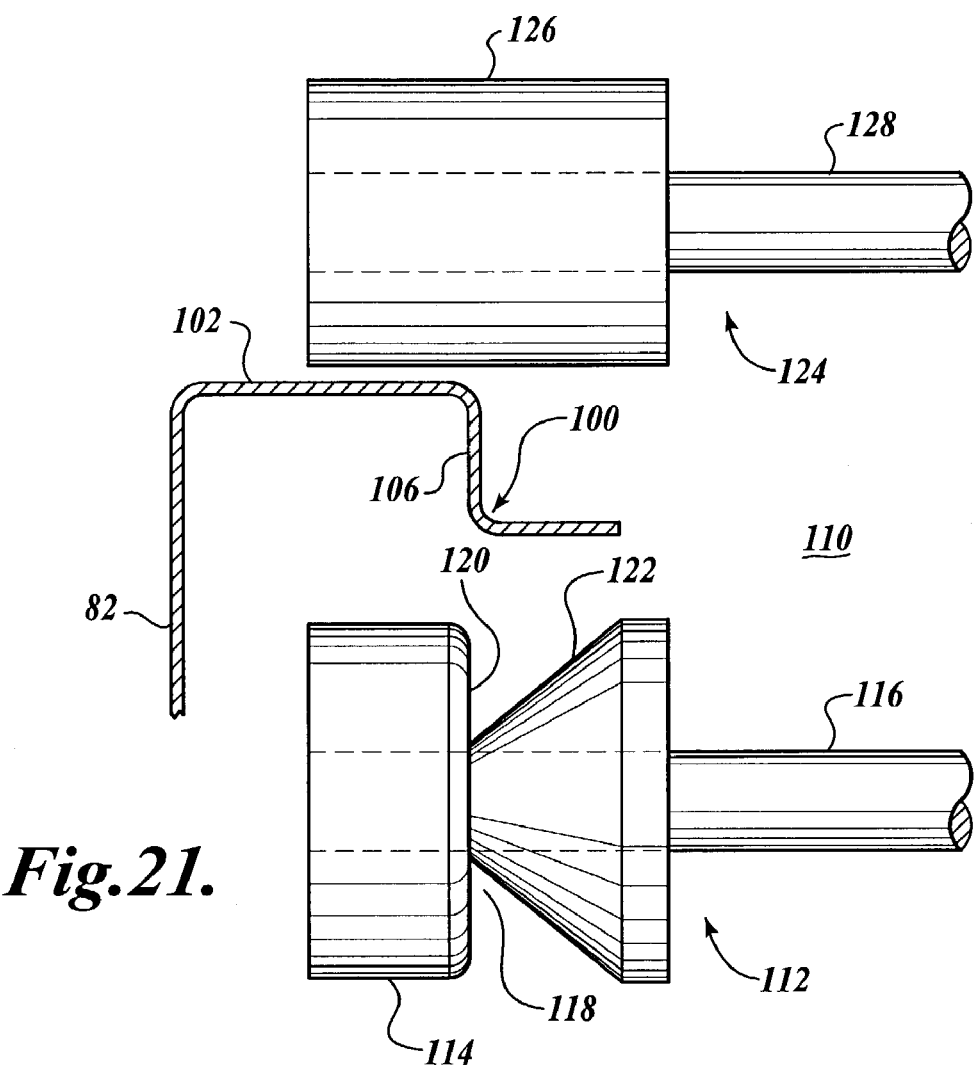
FIG. 21 is a view of a further step in the roll forming of a flanged connector in accordance with the present invention.

The partially formed flanged connector 54 of FIG. 20 is placed in a roller set 110 of FIG. 21 for further processing. The roller set 110 includes a die roller assembly 112 composed of a die roller 114 mounted on a rotatable shaft 116. The die roller 114 has a grove 118 formed around its parameter in a shape of a half "V" composed of a vertical face 120 and a diagonal face 122. The roller set 112 also includes a second roller assembly 124 composed of a cylindrical roller 126 mounted on a rotatable shaft 128. The roller assemblies 114 and 124 are capable of moving towards and away from each other while the rotatable shafts 116 and 128 remain substantially parallel to each other. As shown in FIG. 21, the partially formed flanged connector 54 from FIG. 20 is positioned relative to roller 114 so that hem section 106 is adjacent vertical face 120 of roller 114. Thereafter, the roller assemblies 112 and 124 are moved towards each other as the rollers 114 and 126 rotate relate to each other thereby causing the return section 104 to assume the orientation of diagonal roller face 122 relative to roller face 120, as shown in FIG. 22.

Figure 22:
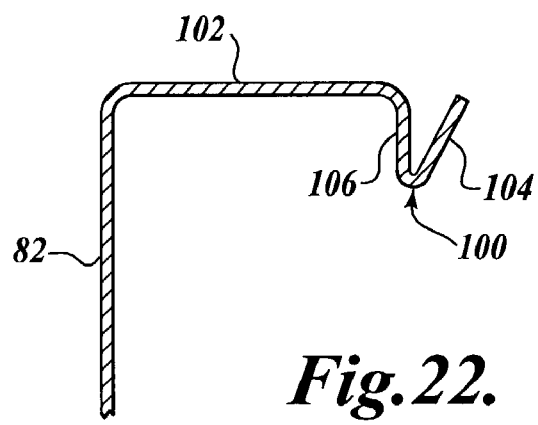
FIG. 22 is a cross-sectional view of a partially formed flanged connector after being worked with the roll forming apparatus shown in FIG. 21.
Figure 23:
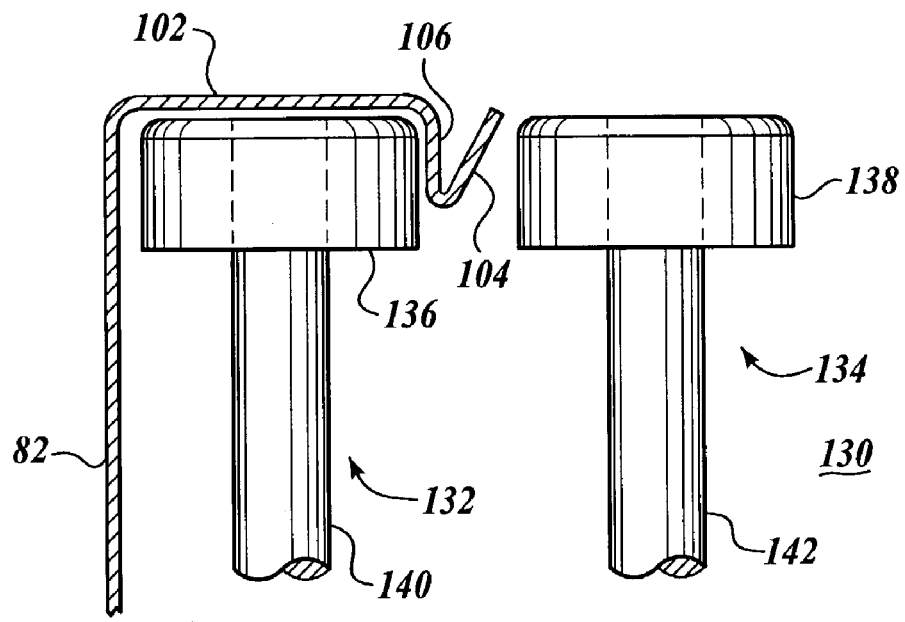
FIG. 23 is a further step in the roll forming process.
Figure 24:
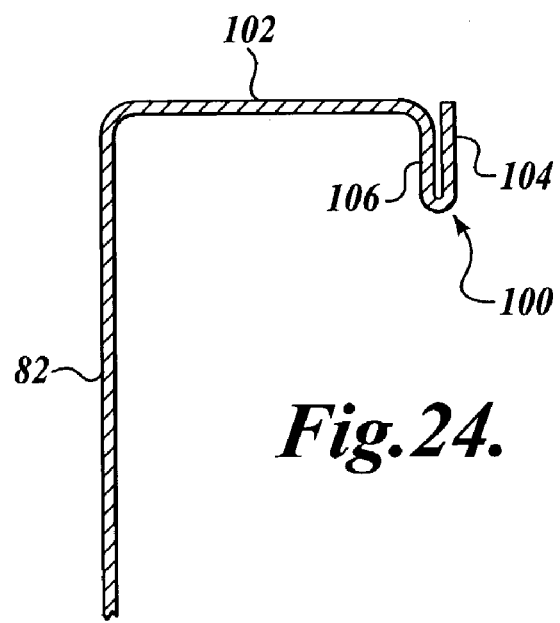
FIG. 24 is a cross-sectional view of the partially formed flanged connector corresponding to FIGS. 9 and 14.
Figure 25:
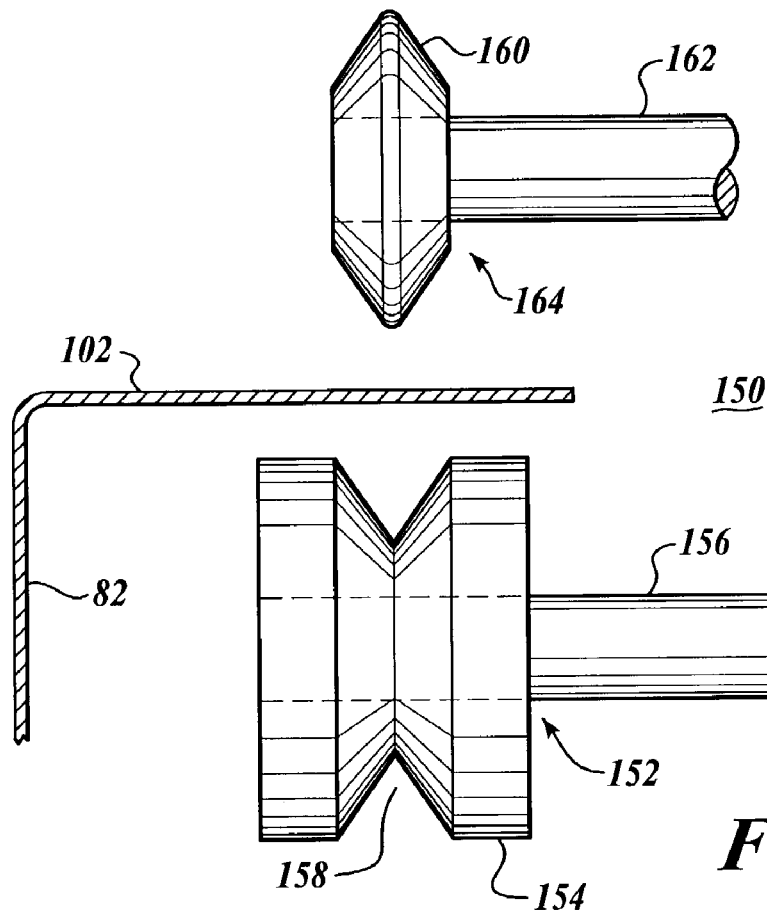
FIG. 25 is a step in an alternative embodiment of roll forming flange connectors according to the present invention.

Thereafter, the partially formed flanged connector 54 in the configuration of FIG. 22 is further formed by a roller set 130 shown in FIG. 23. The roller set 130 consists of a pair of roller assemblies 132 and 134, each composed of a roller 136 and 138 carried by corresponding rotatable shafts 140 and 142. As shown in FIG. 23, the hem section 106 and the partially formed return flange 104 are placed between the two rollers 136 and 138, and then the two rollers are moved towards each other while rotating, thereby to pinch the end section and the return section, therebetween so that the return section closely overlies the end section thereby completing the formation of the reinforcing section 100, as well as partially completing the overall formation of the flanged connector 54, as shown in FIG. 24. The cross-sectional shape of FIG. 24 corresponds to the view of the partially formed flanged connector shown in FIG. 13.

Figure 26:
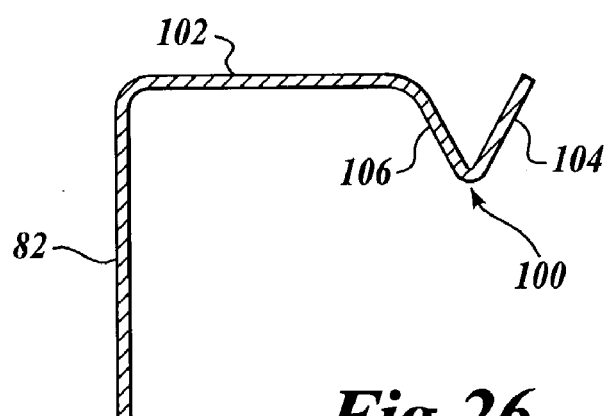
FIG. 26 is a cross-sectional view of a partially formed flanged connector after utilization of the apparatus shown in FIG. 25.

FIGS. 25, 26, 27, and 28, illustrate another method of pre-forming flanged connector 54. As illustrated, the insertion section 82 and the mating flange 102, of the flanged connector, are formed by bending strip stock 71 with the press or with rollers, as described above. Thereafter, the mating flange portion 102, and the material extending outwardly therefrom that will eventually form the hem section 106, and return section 104, of the connector is placed over a roller set 150 to partially form the hem section 106 and return section 104, as shown in FIG. 26. The roller set 150 includes a first roller assembly 152 consisting of a roller die 154 mounted on a rotatable shaft 156. A "V" shaped groove 158 extends around the circumference of the roller die 154 to match the outer parameter profile of a roller die 160 mounted on a rotatable shaft 162 of roller assembly 164. The roller assemblies 152 and 164 are capable of moving towards and away from each other while their respective shafts 156 and 162, rotate and maintain an orientation substantially parallel to each other. As a consequence, when the outer marginal portion of the mating flange 102 is placed in alignment with groove 158 and then the roller dies 154 and 160 are engaged with each other, they cooperatively form hem section 106 and return section 104 in the orientation shown in FIG. 26.

Figure 27:
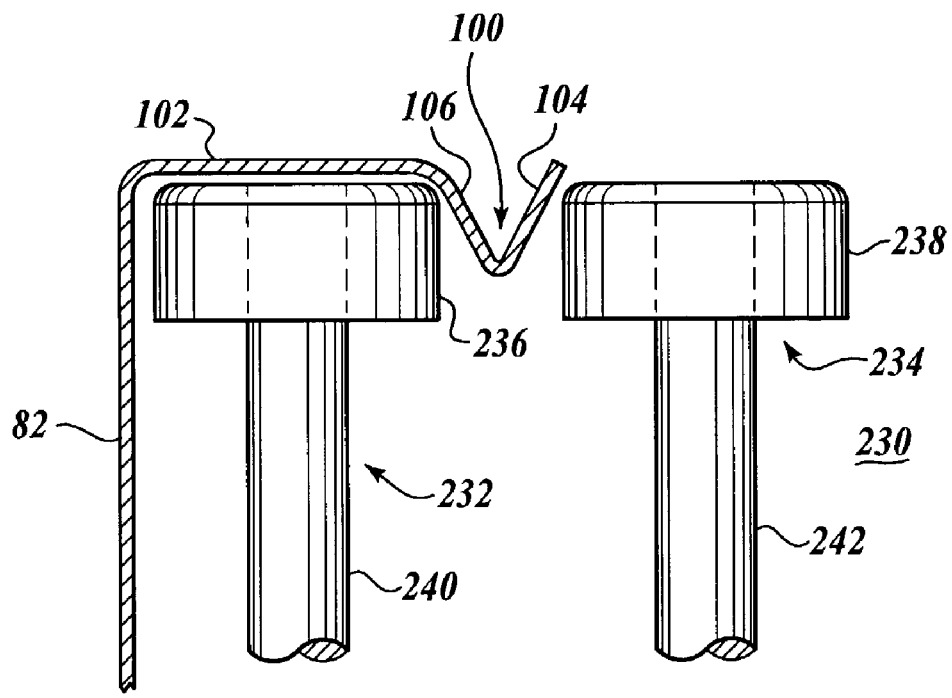
FIG. 27 is a further step in the roll forming process of the present invention.
Figure 28:
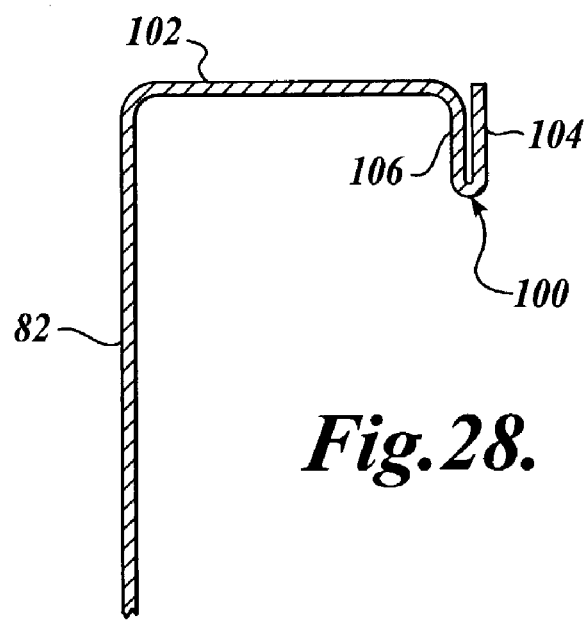
FIG. 28 is a cross-sectional view of a partially formed flanged connector corresponding to FIGS. 9 and 14.
Figure 29:
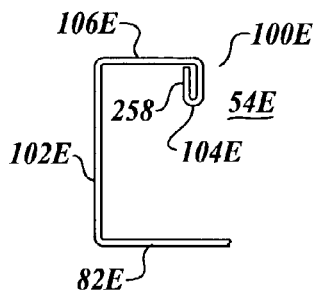
FIGS. 29–38 illustrate alternative embodiments of flanged connectors constructed in accordance with the present invention.
Figure 30:
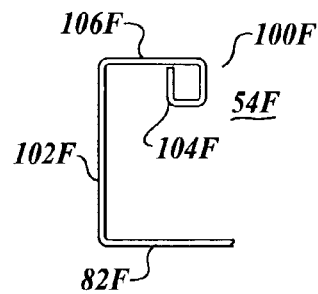
Figure 31:
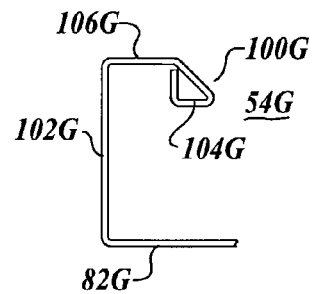

Thereafter, the partially formed flanged connector shown in FIG. 26 is further worked by a roller set 230 shown in FIG. 27. The roller set 230 corresponds to the roller set 130 shown in FIG. 23, with the description set forth above with respect to FIG. 23 applying to FIG. 27, but with the part numbers increased by 100. Thus, such description will not be repeated. The results of roller set 230 is a partially formed flanged connector 54 as shown in FIG. 28. The cross-sectional view of FIG. 28 corresponds to the longitudinal view of the partially formed connector 54 shown in FIG. 13.

Figure 13:
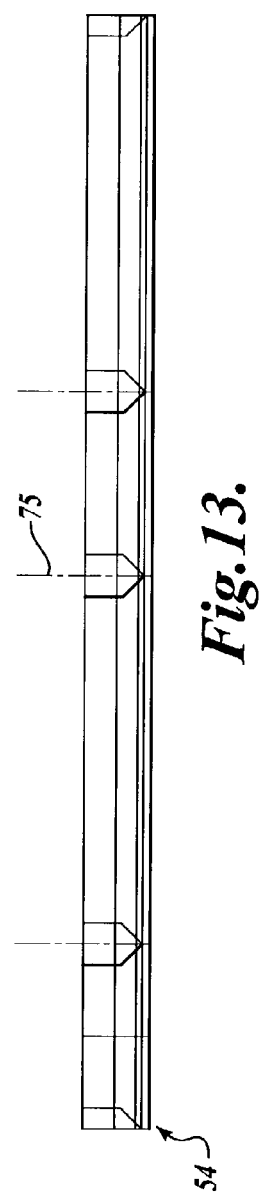
FIG. 13 is a plan view of the strip stock of FIG. 10, after being partially formed by roll forming and/or other manufacturing techniques.

The partially formed flanged connector 54, shown in FIG. 13, is then bent at the center of notches 74 represented by bend line 75 to form a connector of the shape shown in FIG. 9. It will be appreciated that due to the notches 74, the rolled strip stock is readily bent at such notches. It may or may not be necessary to utilize a binding jig. The free ends of the formed flanged connector shown in FIG. 9 are fastened together, such as by welding. Moreover, each of the other three corners of the flanged connector is composed of a miter-joint. As such it is preferable to close these joints by welding the diagonal intersection 246 of the adjacent mating flange segments 102, as well as the corner intersection 248 of the adjacent segments of the insertion section 82, see FIG. 9. In this manner, the formed flanged connector constitutes a structurally sound and strong member capable of securely fastening duct structures together in end-to-end relationship. Such duct structures may be aligned with each other through the use of aligning holes 76 shown in FIG. 9. Also, a gasket, a bead of caulk, or other sealant can be applied to the outward faces of adjacent mating flanges 102 to form an air tight seal therebetween. It will be appreciated that before the flange connector is bent at bend line 75, the thin section 78 between the notches 74 and the edge of the strip stock 72, are cut, snipped, clipped, or otherwise removed.

Figure 11:
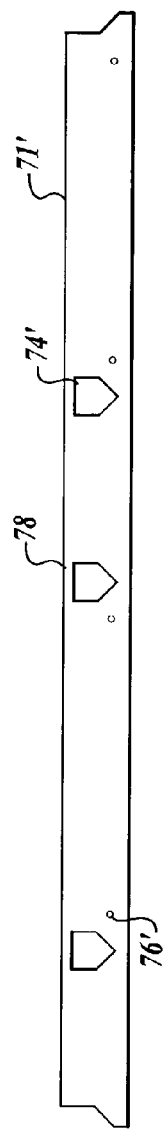
FIG. 11 is an alternative embodiment of strip stock shown in FIG. 10.
Figure 12:
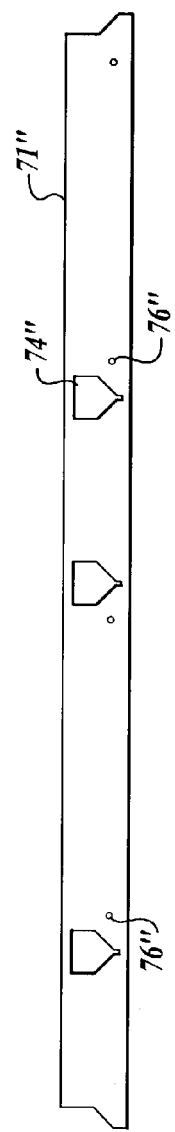
FIG. 12 is a further alternative of the embodiment of the strip stock shown in FIG. 10.

FIGS. 11 and 12 show alternative configures of strip stock 71, identified as part Nos. 71' and 71". The corresponding components and features of strip stock 71' and 71" are identified by the same part numbers as in strip stock 71, with the addition of the (') or (") designation. Strip stock 71' and 71" differ from each other and from strip stock 71 by the configuration of notches 74, 74', and 74". These different configurations are capable of accommodating different cross-sectional profiles of flanged connectors. Also, notches 74' and 74" are inset further away from the edges of the strip stock 71' and 71" than the location of notch 74 of strip stock 71. This may be desirable to help prevent distortion in the strip stock as it is being formed into the cross-sectional shape showing FIGS. 24 and 28. The strip stock is composed of relatively thin gauge material, typically from 10 to 20 gauge, but can be of other gauge material. In the foregoing description, the notches 74, 74', and 74", were described as being cut out or make prior to the forming of the forming of the strip stock into the profile shown in FIGS. 24 and 28. However, such notches can be cut out after the desired profile of the flanged connector is formed, as described above by roll forming and/or bending and/or other well-known techniques. This alternative sequence may be desirable if the particular cross-sectional profile of the flange connector would be such that the strip stock would tend to distort or warp or not otherwise retain the desired shape during forming.

Figure 1:
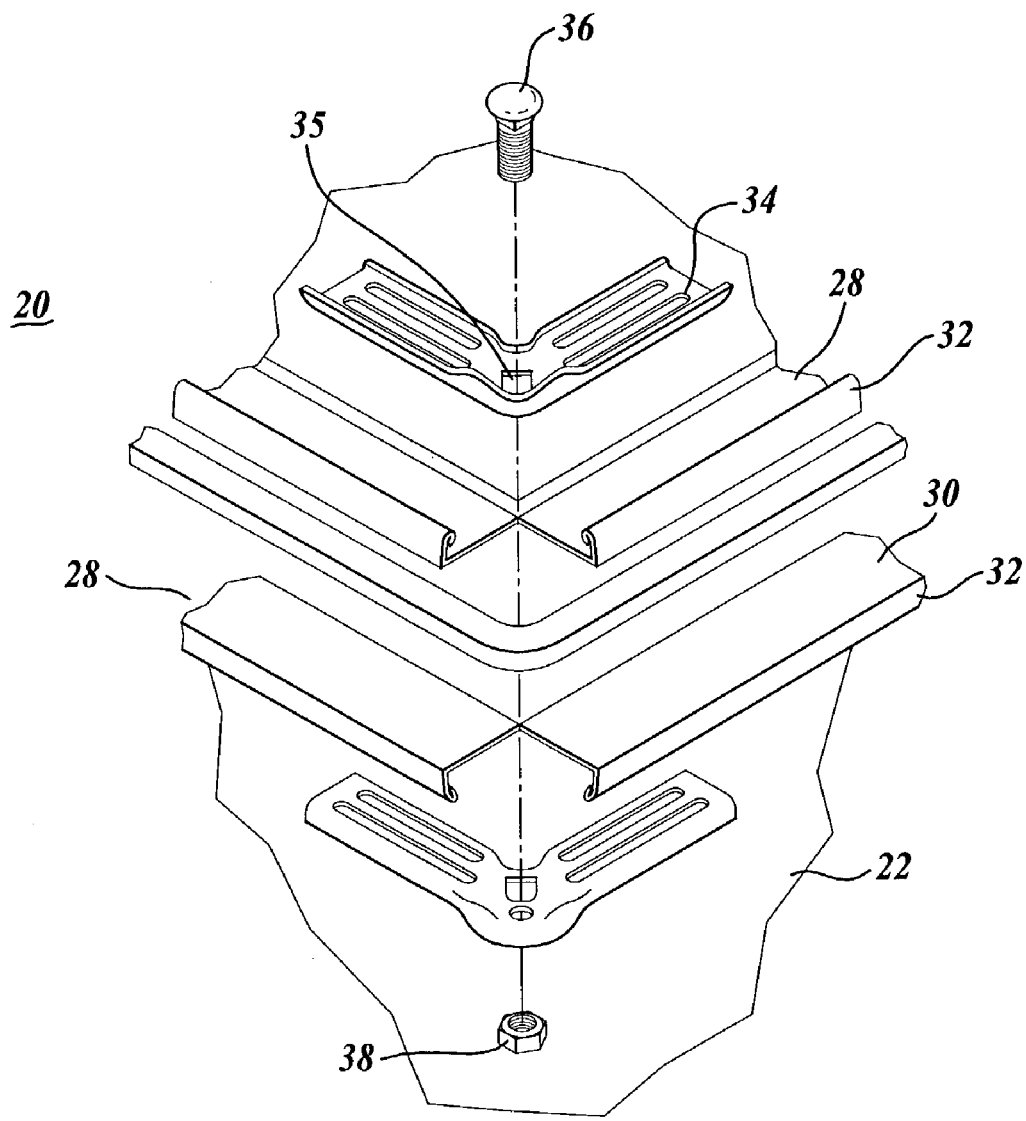
FIG. 1 is a fragmentary view of the corner portions of a prior art ducting structure.
Figure 2:
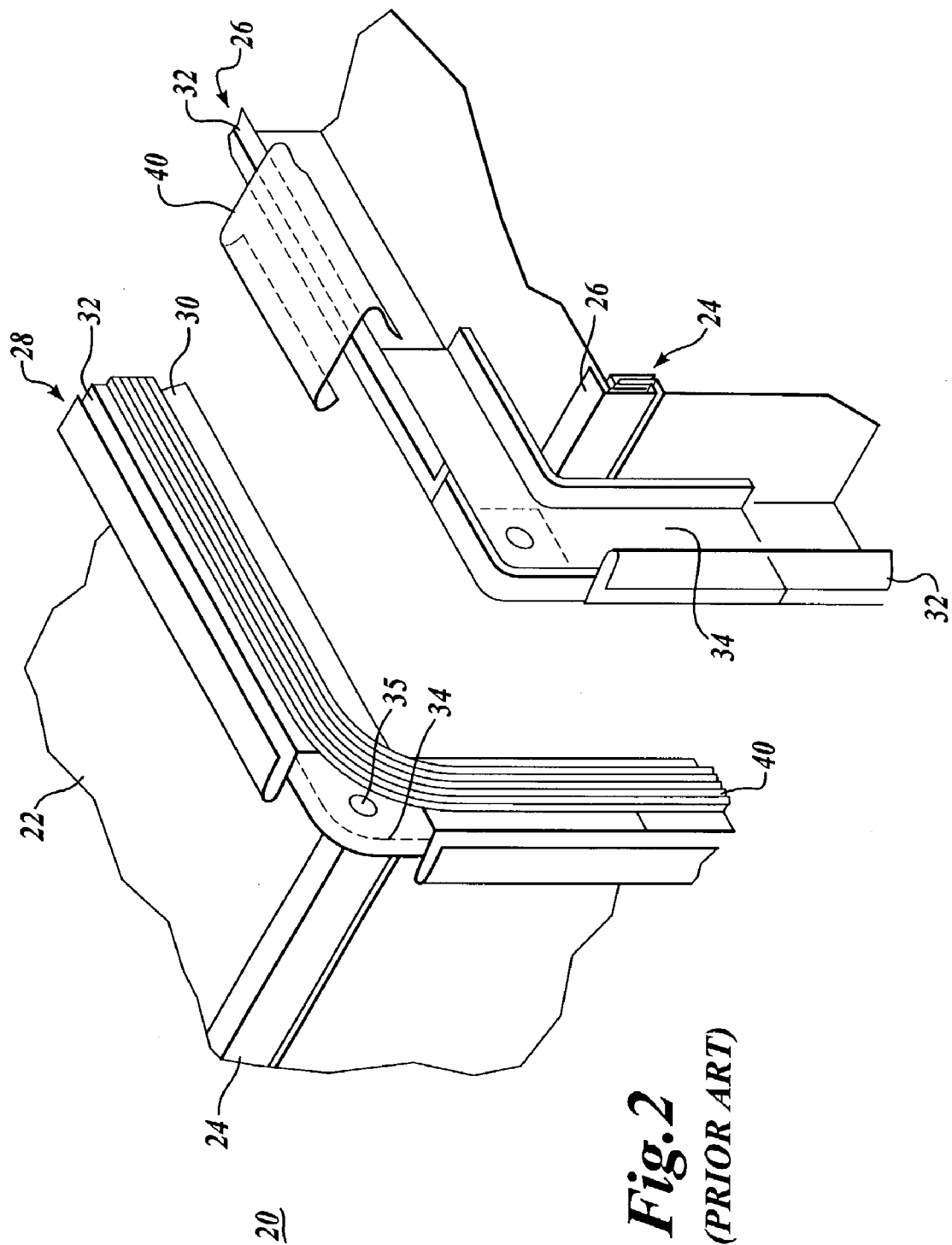
FIG. 2 is another fragmentary view of prior art ducting structure.
Figure 3:
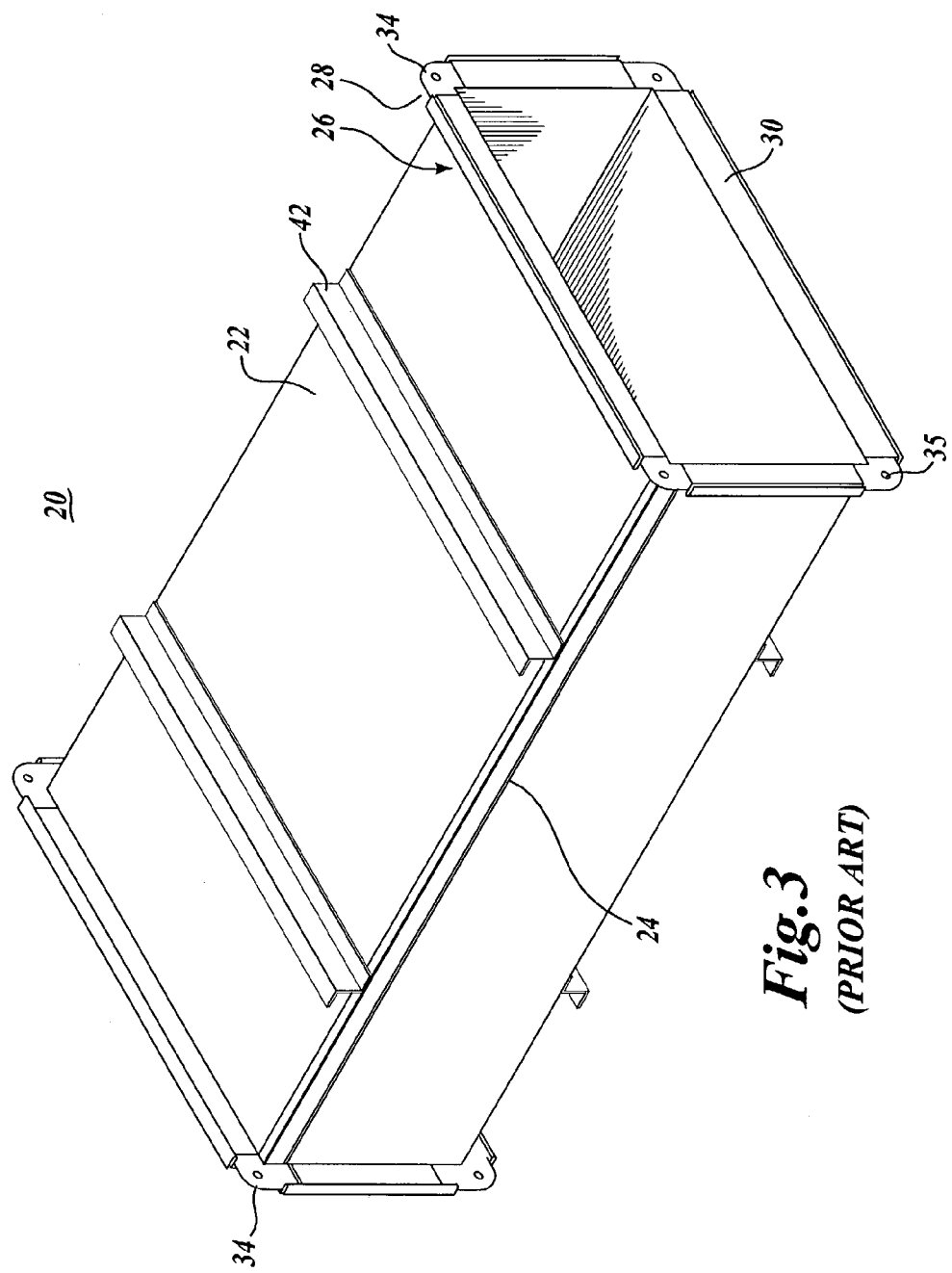
FIG. 3 is a pictorial view of a prior art ducting structure corresponding to FIGS. 1 and 2.
Figure 14:
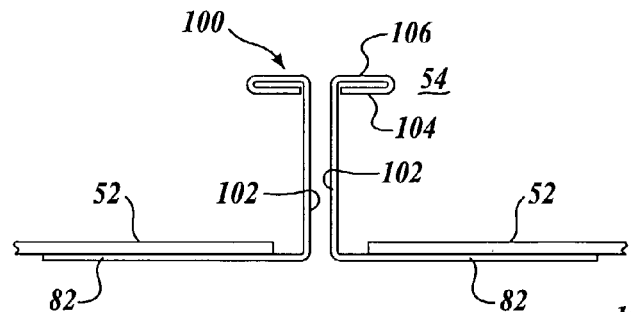
FIG. 14 illustrates a pair of flanged connectors corresponding to FIG. 9, shown in face-to-face relationship.

Two of the flanged connectors 54, as shown in FIGS. 9, 24, and 28, are illustrated in face-to-face relationship to each in FIG. 14. Such flange connectors may be retained in face-to-face relationship to each other by use of fasteners, such as self-threading screws extending through the mating flanges 102. As noted above, a gasket, a bead of caulk, or other material may be interposed between the mating flanges 102 to achieve an airtight seal therebetween. Also, rather than using threaded fasteners, the flanged connectors may be retained together by clips, for example, clips similar to clips 40 shown in FIG. 2. It can be appreciated, through the present invention, duct structure 50 may be economically manufactured and installed relative to prior art rectangular/square duct structures, including those discussed above.

Figure 15:
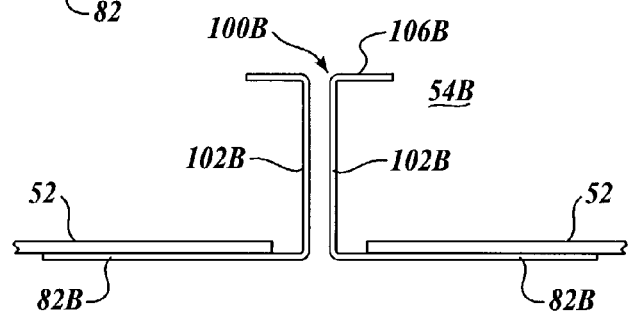
FIG. 15 is an alternative embodiment of flanged connectors constructed in accordance with the present invention shown in face-to-face relationship.
Figure 16:
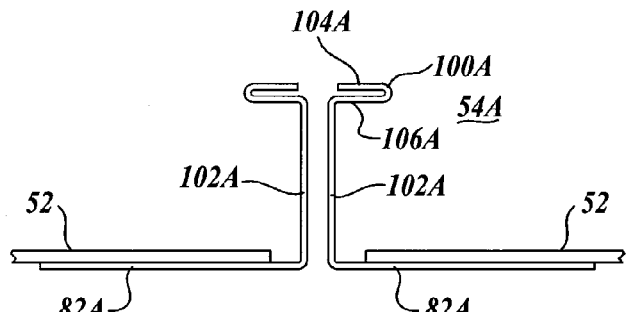
FIGS. 16, 17, and 18, are alternative embodiments of flanged connectors shown in face-to-face relationship.

The flanged connectors 54 correspond to the T24 flange profile standard established by the Sheet Metal and Air-Conditioning Contractors National Association (SMACNA). Moreover, such connectors are capable of achieving a connector rating from E–J under SMACNA standards. The present invention can be utilized to readily produce other cross-sectional profiles for flanged connectors. Several examples of other profiles are illustrated in FIGS. 15–18. In these figures the part numbers corresponding thereto are identified with the same part numbers as in FIG. 15, but with a letter suffix. As a first example, the flanged connector shown in FIG. 16 is also considered to correspond to the SMACNA T24 profile, but with the return section 104 outward of the hem section 106 rather than inward as shown in FIG. 15.

Figure 17:
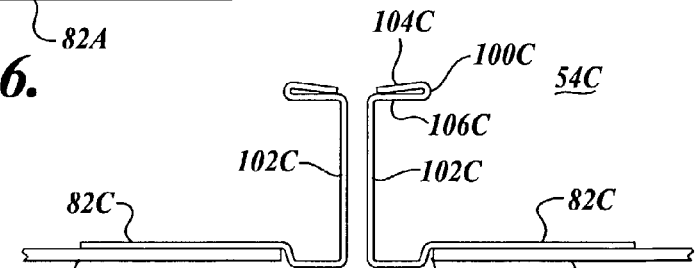
Figure 18:
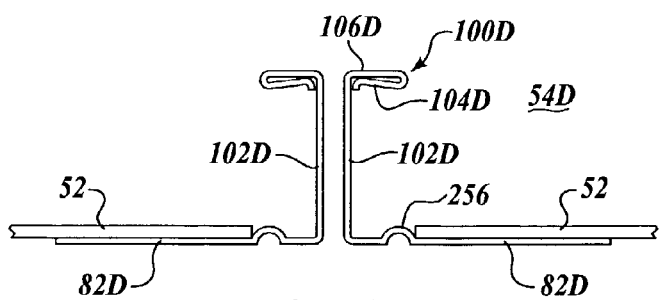

FIG. 15 illustrates flanged connectors 54B, which are similar to flanged connectors 54 and 54A, but without a return section 104. This profile corresponds to SMACNA profile T24A. FIGS. 17 and 18 depict flange connector profiles 54C and 54D which also can be manufactured in accordance with the present invention. One manner in which the profile shown in FIG. 17 differs from that shown in FIGS. 15 and 16 is that the insertion portion 82C is offset slightly upwardly at a location 254, a distance away from mating flange 102C. This offset provides increased structural strength for the insertion flange portion 82C and also serves as an abutment for the end of duct 82C. The insertion flange section 82D, shown in FIG. 18, is also constructed somewhat differently than in FIGS. 14–17. In this regard, an arcuate, inwardly directed ridge 256 is formed in the insertion flange portion 82D. This ridge can serve as a locator for the end of duct 52 within which the insertion flange is engaged.

FIGS. 29–38 illustrate alternative embodiments of insertion flange 54. These alternative embodiments differ primarily in the configuration of the re-enforcing sections 100E–100N. In these embodiments, like components/features of these flanged connectors are given the same item number as for flanged connector 54, but with the addition of an alphabetic suffix E-N. In each of the flanged connector profiles 54E–54N, the hem section 106E–106N is provided. However, rather than having a return section that is simply folded over on hem section, each of the re-enforcing sections 100E–100N are somewhat different in configuration. For example, in FIG. 29, the return section 104E actually extends laterally from the distal end of the hem section 106E (downwardly, shown in FIG. 29) and then is folded over on itself at 258 in the direction facing the mating flange. It is to be understood that the folded over portion 258 could alternatively be folded over to the outside, i.e., away from the mating flange portion 102E.

Figure 32:
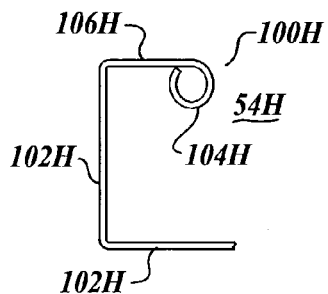
Figure 33:
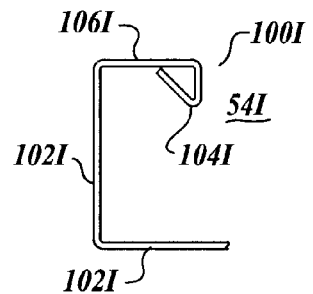
Figure 34:
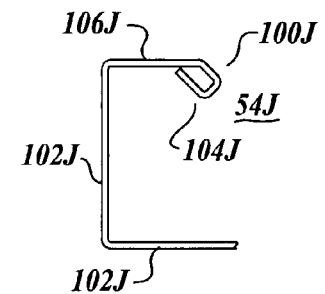
Figure 35:
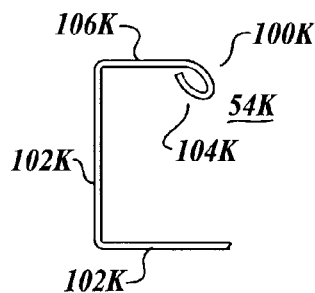
Figure 36:
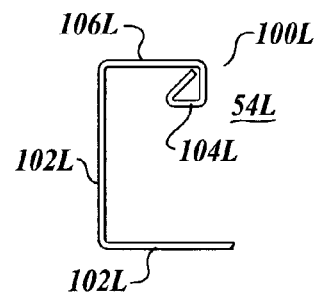
Figure 37:
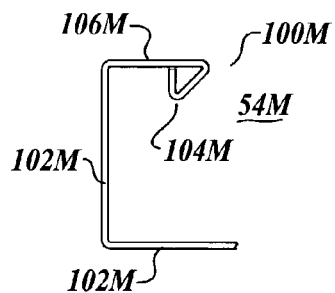
Figure 38:
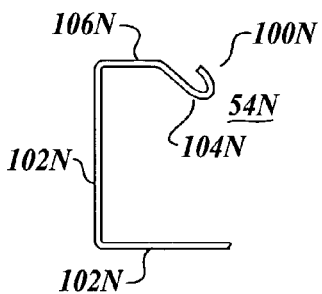
Figure 39:
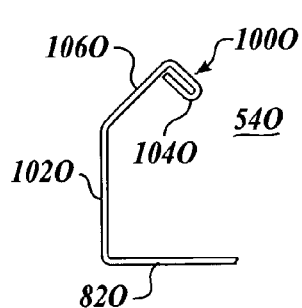
FIGS. 39–48 illustrate additional flanged connector profiles constructed in accordance with the present invention.
Figure 40:
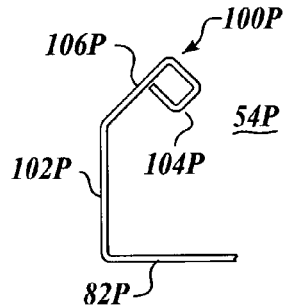
Figure 41:
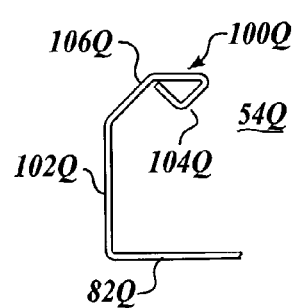
Figure 42:
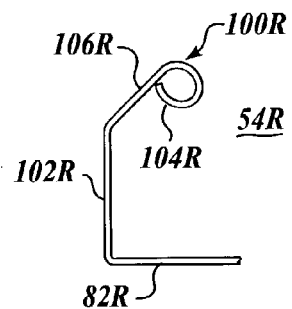
Figure 43:
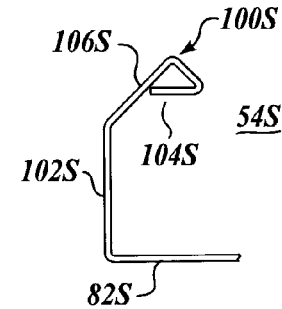
Figure 44:
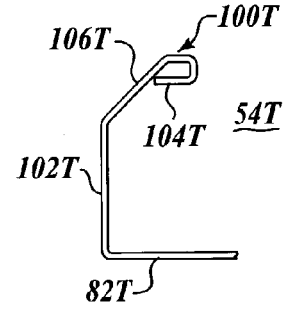
Figure 45:
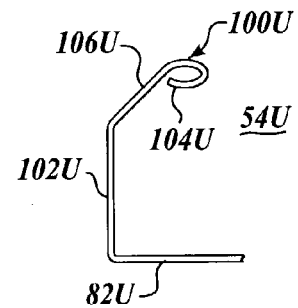
Figure 46:
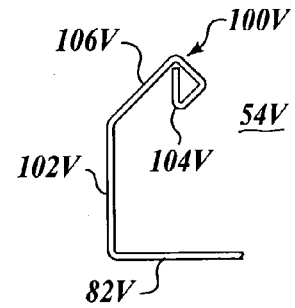
Figure 47:
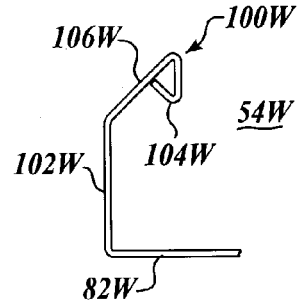
Figure 48:
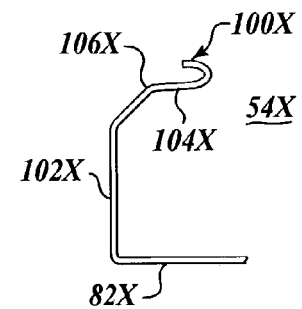
Figure 49:
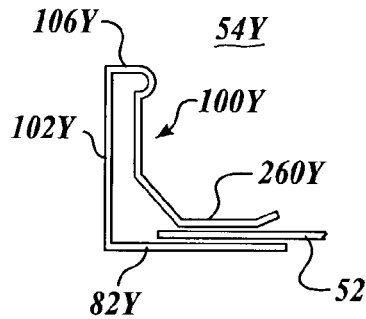
FIGS. 49–57 illustrate still further embodiments of flange connector profiles constructed in accordance with the present invention.
Figure 50:
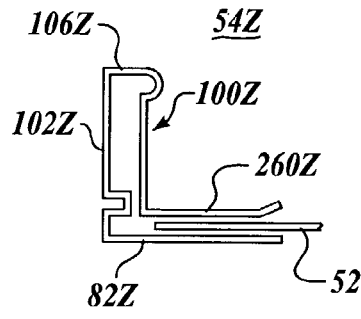
Figure 51:
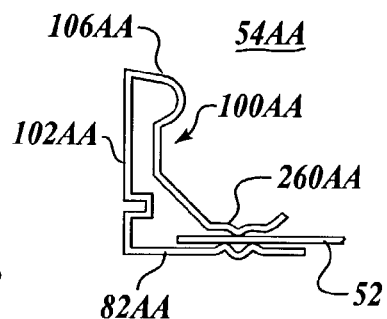
Figure 52:
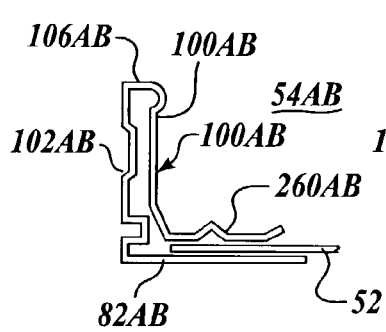
Figure 53:
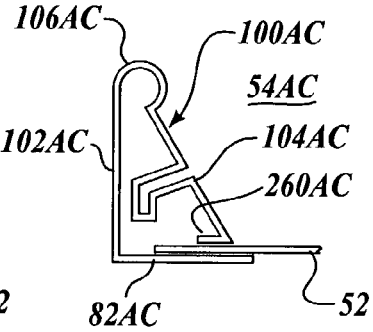
Figure 54:
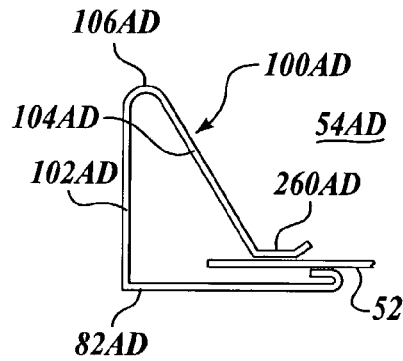

FIGS. 30–38 illustrate alternative embodiments of the return section 104F–104N. For example in FIG. 30, the return section 104F is shown as substantially rectangular or square in cross-section. Whereas, in FIGS. 31, 33, 36, and 37, the return sections 104G, 104I, 104L, and 104M, are substantially triangular in shape. In FIG. 32, the return section 104H is substantially circular. In FIG. 34, the return flange portion 104J is generally rectilinear in shape. In FIG. 35, the return flange portion 104K is generally oval, and in FIG. 38, the return flange portion 104N is generally hookshaped, substantially in reverse direction to the return section 104K shown in FIG. 35. It is to be appreciated that embodiments other than those in FIGS. 29–38 may be utilized for the flanged connector, including the return section of the flanged connector.

FIGS. 39–48 illustrate further alternative embodiments of flanged connectors. The flanged connectors 54O-54X are similar to flange connectors 54E–54N, but with the exception that the hem sections 106O-106X extend diagonally from the distal (outer) portion of corresponding mating flanges 102O-102X, relative to corresponding mating flanges 102E–102N. The hem sections 106O-106X may be disposed at other angles than shown in FIGS. 30–48. In addition, rather than being relatively straight, the hem sections 106O-106X may be curved, arced, or in other shapes.

FIGS. 49–57 illustrate alternative embodiments of flanged connectors, designated as 54Y–54AG. As in flanged connector 54, such alternative flanged connectors each includes an insertion section, a mating flange and a re-enforcing section. These complements of the flanged connector are given the same part numbers as in FIGS. 9, 24, and 28, but with the addition of a corresponding letter suffix.

In the flanged connectors 54Y–54AD shown in FIGS. 49–54, each includes a short hem section 106Y–106AD extending laterally from the distal (outer) edge of the corresponding mating flange 102Y–102AD and then a return section 104Y–104AD that extends downwardly either substantially parallel to the mating flange or diagonally downwardly and away from the mating flange. Also, each of the flanged connectors 54Y–54AD includes a retention leg section 260Y–260AD, respectively. Such retention leg sections may be substantially parallel to the corresponding insertion structures 82Y–82AD, and help serve to capture or retain the duct 52 between the insertion section and the leg section. The distal end of the leg sections, shown in FIGS. 49–52, and 54, is flared away from insertion section 82Y–82AB and 82AD, so as to function as a "lead-in" for the duct 52 when the flanged connector is assembled with the duct.

Figure 55:
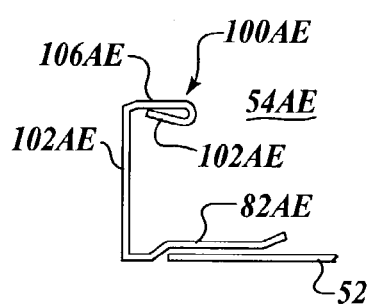
Figure 56:
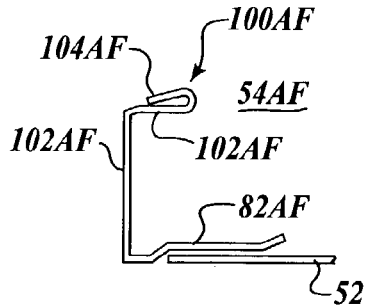
Figure 57:
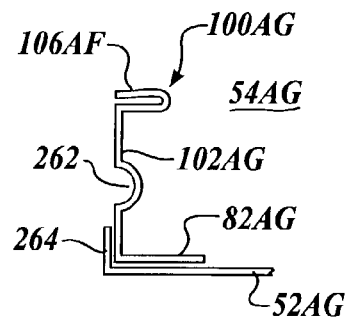

The flange connectors 54AE, 54AF, and 54AG, as shown in FIGS. 55, 56, and 57, do not have leg section 260. However, in flange connectors 54AE and 54AF, the insertion sections 82AE and 82AF are offset similar to that shown in FIG. 17. Also, the distal end portions of the insertion sections 82AE and 82AF extend or flare diagonally toward the hem section to define a "lead in" since in these embodiments the insertion section is actually exterior to the adjacent end portion of the duct 52.

The flanged connector 54AG shown in FIG. 57 is formed similarly to a T24 profile, about a groove 262 formed in the mating flange 102AG. A bead of caulk or round sealing ring, not shown, or other type of seal, may be placed within the groove 262 to provide an air tight seal when the flanged connector is installed. As shown in FIG. 57, the end of the duct 52 includes an outwardly directed end flange 264 that overlaps a portion of the mating flange 102. The end flange 264 may be readily formed with a die structure, rollers, or other means known in the art.

It will be appreciated that the connectors described above in addition to interconnecting lengths of square or rectangular ducting, can also be used as stiffeners for duct lengths. Such connectors can be manufactured in sizes to closely slideably engage over the duct. Once in place, the connectors can be affixed to the duct wall by any convenient manner, such as with hardware members, for example, threaded screws extending through the insertion sections of the connector and in to the underlying wall of the duct, or by welding.

While preferred embodiments of the invention have been illustrated and described, it will be appreciated that various changes can be made therein without departing from the spirit and scope of the invention. In this regard, various configurations and cross-sectional profiles for flange connectors of the present invention have been illustrated and described. These various profiles can be manufactured utilizing the methods of the present invention, beginning with a length of strip stock and forming the desired cross-sectional profile in the strip stock using roll forming bending and other well known techniques. Thereafter, the length of formed strip stock is bent into a square or rectangular configuration corresponding to the cross-sectional shape of the duct being connected together. These methods can be used to form flanged connector rings of other profiles not shown and described herein, for square and rectangular ducts.

The invention claimed is:

1. A method of forming flanged connectors for interconnecting adjacent ends of ducting for use in a heating, ventilating and air conditioning system, the ducting being of a rectilinear cross-section, the flanged connectors having an insertion section and a mating flange section, the method comprising:
   (a) notching the length of strip material to remove portions of the strip material corresponding to the insertion section and corresponding to the mating flange section, thereby to define the corners of the flanged connector;
   (b) forming the strip material into a desired cross-sectional shape, said cross-sectional shape comprising the insertion section to engage within or over an adjacent end portion of a ducting section and the mating flange section disposed substantially perpendicular to the insertion section for mating with the mating flange section of a corresponding flanged connector;
   (c) bending the formed strip material at the notches to define a rectilinear shape corresponding to the cross-sectional shape of the ducting to be interconnected wherein the mating flange portion extending continuously around the insertion section; and
   (d) affixing the end portions of the bent and formed strip stock together to form a closed rectilinear-shaped flanged connector corresponding to the cross-sectional shape of the ducting to be interconnected.

2. A method according to claim 1, wherein the step of forming the strip material into a desired cross-sectional shape occurs after the step of notching the length of a strip stock to define the corners of the flanged connector.

3. A method according to claim 1, wherein the step of notching of the length of strip stock to define the corners of the flanged connector occurs after the step of forming the strip stock into a desired cross-sectional shape.

4. A method according to claim 1, wherein the step of forming the strip stock further comprising forming a reinforcing section attached to said mating flange section distal from the insertion section said reinforcing section remaining unnotched.

5. A method according to claim 4, wherein the step of forming the reinforcing section comprising forming a hem section projecting from the mating section in a direction away from the mating section.

6. A method according to claim 5, wherein said hem section extending in a direction corresponding to the direction that the insertion section extends from the mating section.

7. A method according to claim 6, wherein said hem section and said insertion section are substantially parallel to each other.

8. A method according to claim 6, wherein said hem section extending substantially diagonal in relationship to the mating section.

9. A method according to claim 6, wherein the hem section extending substantially perpendicularly to the mating section.

10. A method according to claim 5, wherein the step of forming the reinforcing section further comprising forming a distal portion of the hem section over on itself to define a return section.

11. A method according to claim 10, wherein said return section is disposed at an angle relative to a hem section.

12. A method according to claim 10, wherein said return section is in the form of a bead section.

13. A method according to claim 12, wherein said bead section in cross-section of shape selected from the group consisting of square, triangular, rectilinear, circular and oval.

14. A method according to claim 4, wherein the step of forming the reinforcing section comprising forming a hem section projecting away from the mating section in a direction substantially along the mating section toward the insertion section.

15. A method according to claim 14, further comprising the step of forming an extension section projecting from the hem section in a direction substantially along the insertion section.

16. A method according to claim 1, wherein the mating flange section is substantially planar.

17. A method according to claim 1, wherein the mating flange section is substantially planar and is formed with a depression extending along the plane of the mating flange section.

18. A method according to claim 17, wherein the depression in cross-section is in a shape selected from semicircular, triangular, rectangular, rectilinear, square, ovoid and arcuate.

19. A method according to claim 1, wherein the strip material is formed into a desired cross-sectional shape by passing the strip material through a plurality of forming rollers.

20. The method of claim 19, further comprising forming the strip material into a desired cross-sectional shape also by pressing the strip material along its length.

21. The method of claim 1, wherein the removed portion of the mating flange section by notching is triangular in shape.

22. The method of claim 21, wherein the removed portion of the insertion section by notching is rectilinear in shape.

* * * * *

UNITED STATES PATENT AND TRADEMARK OFFICE
CERTIFICATE OF CORRECTION

PATENT NO. : 7,104,104 B1 Page 1 of 1
APPLICATION NO. : 10/359017
DATED : September 12, 2006
INVENTOR(S) : J. A. Hermanson It is certified that error appears in the above-identified patent and that said Letters Patent is hereby corrected as shown below:

| ON THE TITLE PG. | LINE | ERROR |
|---|---|---|
| Item (57) | Abstract | "(50), includes" should read --(50) includes-- |
| Col. 10 | 62 | "insertion section" should read --insertion sections,-- |
| Col. 11 | 23 | "section in" should read --section is in-- |

Signed and Sealed this

Sixth Day of October, 2009

David J. Kappos
*Director of the United States Patent and Trademark Office*